United States Patent Office 3,186,974
Patented June 1, 1965

3,186,974
PROCESS FOR COPOLYMERIZING VINYL ESTERS OF ALPHA-BRANCHED MONOCARBOXYLIC ACIDS WITH ETHYLENICALLY UNSATURATED COMPOUNDS
Govert Verberg, Amsterdam, Netherlands, assignor to Shell Oil Company, New York, N.Y., a corporation of Delaware
No Drawing. Filed Aug. 11, 1961, Ser. No. 130,751
Claims priority, application Netherlands, Dec. 30, 1960, 259,618
10 Claims. (Cl. 260—85.7)

This invention relates to a process for copolymerizing vinyl esters of monocarboxylic acids with other ethylenically unsaturated compounds. More particularly the invention relates to a process for coplymerizing vinyl esters of saturated aliphatic monocarboxylic acids branched at the alpha position with other ethylenically unsaturated compounds.

Specifically, the invention provides a process for the copolymerization of vinyl esters of mixed saturated monocarboxylic acids branched at the alpha position with another copolymerizable ethylenically unsaturated compound, said monocarboxylic acids being obtained by reacting mixtures of saturated or olefinic hydrocarbons containing at least 8 carbon atoms in the molecule with a member of the group consisting of (a) formic acid and (b) carbon monoxide and water, in the presence of acid catalysts.

The stability and weathering properties of polyvinyl esters depend largely upon the hydrolyzability of the esters. While the polyvinyl esters are suitable for many uses, they suffer from many shortcomings. For example, polyvinyl acetate is known to be hard and brittle and, when used in emulsion paints, must invariably be modified with plasticizers. Further, such esters are readily saponified with alkali and hydrolyze fairly rapidly in suspension. Because of these shortcomings, paint films prepared from these esters not only have poor tensile strength but also have high water absorption and poor resistance to wet brushing.

It is therefore an object of the present invention to provide a process for copolymerizing vinyl esters of saturated monocarboxylic acids branched at the alpha position with other ethylenically unsaturated compounds. It is another object to provide a process for copolymerizing vinyl esters of saturated monocarboxylic acid branched at the alpha position with other ethylenically unsaturated compounds to form polymers which are suitable for use in emulsion paints and for surface coatings. It is another object to provide a process for preparing copolymers of vinyl esters and other ethylenically unsaturated compounds which have satisfactory tensile strength and a high resistance to saponification and hydrolysis. It is a further object to provide a process for copolymerizing vinyl esters of monocarboxylic acids branched at the alpha-position with vinyl acetate to produce a copolymer in which the acetate groups are very difficult to remove by hydrolysis from said copolymer and paint films prepared from this copolymer have low water absorption and very good resistance to wet brushing. It is still another object to prepare polymers which are useful without the use of plasticizers. It is still a further object to prepare copolymers which improve the viscosity/temperature relationship in lubricating oils. It is still a further object to prepare copolymers which, when added to lubricating oils, have also a purifying and anti-rust effect. Other objects and advantages of the invention will become apparent to one skilled in the art from the accompanying disclosure and discussion.

It has now been discovered that these and other objects may be accomplished by the process for copolymerizing vinyl esters of mixed saturated monocarboxylic acids branched at the alpha position with other ethylenically unsaturated compounds, said monocarboxylic acids being obtained by reacting mixtures of saturated or olefinic hydrocarbons containing at least 8 carbon atoms in the molecule with a member of the group consisting of (a) formic acid and (b) carbon monoxide and water, in the presence of acid catalysts.

It has also been found that this process of copolymerization provides polymers which are suitable for surface coatings and in emulsion paints. Said copolymers are hard yet flexible and have an unexepcted high resistance to saponification and hydrolysis. The paint films prepared from said copolymers have a low water absorption and a very good resistance to wet brushing.

The special properties of the copolymers obtained according to the invention are associated with the particular structure of the saturated aliphatic monocarboxylic acids branched at the alpha position which are used as base material. The products of the reaction of saturated or olefinic hydrocarbons containing at least 8 carbon atoms in the molecule with formic acid or with carbon monoxide and water, which reaction takes place in the presence of acid catalysts, are mixtures of saturated, aliphatic monocarboxylic acids branched at the alpha position, largely consisting of molecules in which at least two hydrocarbon chains each of at least two carbon atoms are attached to the quaternary or tertiary carbon atom carrying the carboxyl group. The hydrocarbons reacting with formic acid, or with carbon monoxide and water, may be acyclic or alicyclic. In general, the acyclic, saturated, aliphatic monocarboxylic acids branched at the alpha position and having the above configuration, are preferred. Examples of this structure are 3-methyl-heptane-carboxylic acid-3 and 4-methyloctane-carboxylic acid-4. These saturated aliphatic monocarboxylic acids branched at the alpha position prepared by reacting olefinic hydrocarbons with formic acid or with carbon monoxide and water in in the presence of acid catalysts are usually called Koch acids in the art.

The monocarboxylic acids branched at the alpha position are preferably prepared starting from mixtures of olefins with at least 8 carbon atoms in the molecule and preferably less than 20 carbon atoms, and more preferably from about 9 to 11 carbon atoms, obtained by cracking of paraffins, such as paraffin wax, high-boiling mineral oil fractions and distillation residues. These mixtures of olefins contain branched and straight-chain aliphatic and, as a rule, also alicyclic hydrocarbons. The said monocarboxylic acids may also be prepared starting from olefins with at least 8 carbon atoms in the molecule, obtained by polymerization of lower olefins. Furthermore, the preparation of the monocarboxylic acids branched at the alpha position may also start from saturated aliphatic hydrocarbons with at least 8 carbon atoms in the molecule, provided hydrogen acceptors are present as well. Suitable hydrogen acceptors are olefins or compounds, such as alcohols and alkyl halides, from which olefins can be obtained by splitting off water or hydrogen halide, respectively. As catalysts for these carboxylation reactions preferably liquid acids, such as phosphoric acid, complexes of phosphoric acid, boron trifluoride and water, hydrates of boron trifluoride, and sulfuric acid are used.

The vinyl esters of the said monocarboxylic acids branched at the alpha position may be prepared from the acids by known techniques, for instance, by reaction of the acid mixture with vinyl acetate in the presence of a mercury salt, or by reaction of the acids with acetylene in the presence of zinc, cadmium or mercury compounds.

The vinyl esters of monocarboxylic acids branched at the alpha position are according to the invention preferably copolymerized with other copolymerizable ethylenically unsaturated compounds, containing on either side of the double bond or bonds up to about 8 carbon atoms. Examples of such compounds are vinyl acetate and vinyl esters of other carboxylic acids, such as pivalic acid, vinyl chloride, vinylidene chloride, acrylonitrile, esters of unsaturated carboxylic acids, such as methyl acrylate, ethyl methacrylate, diethyl maleate and dibutyl fumarate, and unsaturated hydrocarbons, such as ethylene, propylene, styrene, alkyl substituted styrenes, conjugated dienes such as butadiene, isoprene, and the like.

The molar ratio of the vinyl esters of monocarboxylic acids branched at the alpha position which are incorporated in the copolymer with other monomers may vary considerably, but is, as a rule, preferably below 1:1. Molar ratios of vinyl esters of monocarboxylic acids branched at the alpha position to other monomers between 1:1 and 1:4 are mostly preferred. Accordingly, as the number of carbon atoms in the latter vinyl esters is larger, it is recommended to choose a lower ratio.

Polymerization may be effected according to known techniques, both with and without diluents. When using diluents one can distinguish between polymerization in solution and polymerization in aqueous dispersion.

According to the latter method emulsifiers and/or protective colloids are as a rule used, stirring being applied as desired.

The copolymerization is initiated and/or catalyzed by conventional means. As a rule substances supplying free radicals are added, such as peroxides, for instance benzoyl peroxide and ditertiary butyl peroxides, other peroxy compounds, such as potassium persulphate and hydrogen peroxide, and diazo compounds, such as alpha-alpha'-azoisobutyronitrile. Often also redox systems are used. The temperatures usually vary between 30° and 150° C., particularly between 50° and 90° C. Polymerization may also be promoted by irradiation, particularly with ultraviolet light.

By means of polymerization in aqueous dispersions, suspensions of the copolymer may be obtained which can be kept for a considerable time and which are therefore very suitable for the formulation of emulsion paints. If desired, however, after polymerization in aqueous dispersion, the suspended copolymer can be precipitated, filtered off or centrifuged, washed and dried.

Emulsion paints with excellent properties can be obtained by emulsion copolymerization with vinyl acetate of the special vinyl esters of monocarboxylic acids branched at the alpha position, applied according to the invention. Polyvinyl acetate is known to be hard and brittle and should, in emulsion paints, invariably be modified with a plasticizer. Also, it is readily saponified with alkali and hydrolyzes fairly rapidly in suspension. The copolymers obtained according to the invention, however, are hard and yet flexible; they have a satisfactory tensile strength and are to an unexpected degree resistant to saponification and hydrolysis. Also, the acetate groups are very difficult to remove by hydrolysis from the copolymer. The paint films from the said novel copolymers have a low water absorption and a very good resistance to wet brushing.

Also copolymerization with vinyl chloride yields attractive copolymers which are suitable for many purposes without the addition of plasticizer. By choosing a suitable monomer ratio the hardness and the flexibility of these copolymers can be varied within wide limits.

Various copolymers obtained according to the invention, in particular those in which vinyl acetate or esters of maleic acid or fumaric acid have been copolymerized, may be applied for improving the viscosity/temperature relationship in lubricating oils. When added to lubricating oils, these substances have also a purifying and anti-rust effect.

Various copolymers obtained according to the invention may further be applied in the form of salts or otherwise, as thickening agents, or as emulsifiers, dispersers and stabilizers for emulsions and suspensions, or for modifying alkyd resins and epoxy resins.

Advantages of the invention are illustrated by the following examples. The reactants and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

EXAMPLE I

Aliphatic monocarboxylic acids in which carboxyl groups are attached to tertiary and/or quaternary carbon atoms and which contain 9 to 11 carbon atoms per molecule were prepared as follows:

A fraction was taken of a product obtained by thermal cracking of a paraffinic base material in the vapor phase in the presence of steam, which fraction consisted for the greater part of alkanes with 8 to 10 carbon atoms. This fraction was partially hydrogenated to convert any dienes present into alkenes. After this hydrogenation the alkenes constituted 76% w. of the mixture, of which 39% w. were straight-chain, 20% w. were branched and 17% w. were cyclic alkenes, while double bonds at terminal carbons hardly occurred. The balance of the mixture consisted of saturated hydrocarbons (17% w.) and aromatics (7% w.).

The olefins were converted into monocarboxylic acids at 60° C. in a reaction mixture while the composition was kept constant. The hydrocarbon mixture containing the olefins was fed at a rate of 0.7 l./h. The catalyst, which consisted of $H_3PO_4$, $BF_3$ and $H_2O$ in the molar ratio of 2:3:2, was fed at a rate of 1.4 l./h. The liquid part of the reaction mixture was kept at a volume of 3 liters. The liquid was kept under a carbon monoxide pressure of 70 atmospheres absolute. Vigorous stirring was applied. The apparatus consisted of chrome-nickel steel.

In the reaction mixture leaving the reaction chamber, the two liquid phases were separated. The phase containing the mixed carboxylic acids was washed continuously and countercurrently at 40° C. with 5% v. of water and subsequently at 20° C. also continuously and countercurrently successively with another 10% v. of a 1% solution of sodium citrate in water and with 10% v. of a 5% solution of sodium bicarbonate in water.

The mixed monocarboxylic acids were extracted from it continuously with excess ammonia in water. From the solution of the ammonium salts the free and bound ammonia was evaporated continuously. The mixed monocarboxylic acids separated as a liquid, and were subsequently dried and distilled in vacuo.

EXAMPLE II

The mixed monocarboxylic acids, obtained according to Example I, were converted in the vapor phase with acetylene into vinyl esters, in the presence of a catalyst consisting of 24% of cadmium silicate on pumice.

Dry acetylene was passed at a rate of 60 l./h. through a vessel in which the said monocarboxylic acids were kept at 200° C. The mixture of acetylene and vapor of the monocarboxylic acids was passed through a quartz tube with a diameter of 25 mm., which was kept in an electric furnace at 300–330° C. This tube was for a length of 45 cm. filled with 150 ml. of said catalyst. The vapors leaving the tube were condensed. The condensate, which contained vinyl esters and also non-converted monocarboxylic acids, was distilled in vacuo.

The vinyl esters (70% m.) were distilled at a pressure of 0.5 mm. Hg at 45–65° C. To remove traces of monocarboxylic acids, the vinyl esters were washed with dilute caustic soda and with water.

EXAMPLE III

The mixed monocarboxylic acids, obtained according to Example I, were converted into the vinyl esters by reaction with vinyl acetate.

In a mixture of 86 g. (0.5 mole) of monocarboxylic acids and 258 g. (3 moles) of vinyl acetate, 2 g. of mercury acetate was dissolved with stirring. After adding 0.3 ml. of 89% phosphoric acid the mixture was kept at 80° C. for 8 hours. Then it was cooled, neutralized with 3 g. of sodium acetate and washed four times with a saturated solution of sodium chloride. The excess vinyl acetate was removed in vacuo and the residue, containing the vinyl esters of branched monocarboxylic acids, was fractionated in vacuo.

The vinyl esters (76% m.) were distilled at a pressure of 0.8 mm. Hg at 50–70° C. They were washed with dilute caustic soda with water to remove traces of monocarboxylic acids. According to gas chromatographic analysis they had the same composition as the vinyl esters according to Example II.

EXAMPLE IV

Aliphatic monocarboxylic acids in which the carboxyl groups are bound to tertiary and/or quaternary carbon atoms, and which contain 15 to 19 carbon atoms per molecule, were prepared from a fraction of olefins with 14 to 18 carbon atoms per molecule, in a manner corresponding with the one described in Example I.

As in Example III, these monocarboxylic acids were converted with vinyl acetate and mercury phosphate into the mixed vinyl esters. The vinyl esters were distilled at a pressure of 0.2 mm. Hg at 72–130° C.

EXAMPLE V

Vinyl esters obtained according to Examples II or III were copolymerized with vinyl acetate in emulsion in molar ratios of 1:4, 1:3 and 1:2. Some results of the application of these emulsion copolymers as emulsion paints have been listed in Table I under the designation copolymer 1:4, 1:3 and 1:2, respectively.

The copolymerizations were performed in the same manner in a flask with a stirrer, reflux condenser and thermometer.

1.15 g. of polyvinyl alcohol (prepared by almost complete saponification of polyvinyl acetate), 0.38 g. of sodium dodecylbenzene sulphonate (prepared by alkylation of benzene with propene tetramer, followed by sulphonation, 0.25 g. of potassium persulfate and 0.13 g. of sodium bicarbonate were dissolved in 48 g. of water. Then 50 g. of a mixture consisting of vinyl acetate and vinyl esters obtained according to Example II or III was added with stirring in the said molar ratio. The air was displaced by nitrogen, and the flask was heated with stirring to 70° C. During the exothermal copolymerization the temperature was kept for 2 hours at 70° C., and then for one-half hour at 80° C. The suspensions of the copolymers were cooled with stirring to room temperature and filtered through cotton wool to remove some coarser particles of copolymer. The concentration of the copolymers in these suspensions was 50% w. At room temperature these suspensions could be kept for a considerable time.

To evaluate the stability of the suspensions they were diluted with an equal volume of water and then centrifuged for one hour. Only 0.1% of the copolymers precipitated during this operation.

To establish the chemical stability of the copolymers the percentage of ester groups saponified by an equivalent quantity of 1 N caustic soda in 24 hours was determined (see Table I). For comparison a polyvinyl acetate suspension was used, prepared in the same way (PVA I). This suspension was found to saponify many times more rapidly.

From the copolymer suspensions, products suitable as emulsion paints were prepared by addition of pigments, such as titanium white. When spread and dried, these paints gave evenly covering coats, strong and very elastic, with low water absorption and high resistance to wet brushing (see Table I). A commercial "emulsion" containing polyvinyl acetate and a polymeric plasticizer (PVA II) and a commercial "emulsion" based on a copolymer of vinyl acetate and vinyl laurate (PVA III) were used as reference materials.

*Table I*

| | Saponification (percent in 24 h.) | Water absorption (percent w. in 10 min.) | Resistance to brushing (number of streaks) |
|---|---|---|---|
| Copolymer 1:4 | 7 | 2.5 | >10,000 |
| Copolymer 1:3 | 6 | 3.0 | 3,500 |
| Copolymer 1:2 | 6 | 2.0 | 1,500 |
| PVA I | 65 | | |
| PVA II | | 32.0 | 400 |
| PVA III | | 25.0 | <100 |

EXAMPLE VI

Vinyl esters prepared according to Example IV were copolymerized with vinyl acetate in the molar ratio 1:1, in the presence of 0.25% m. benzoyl peroxide, at 50° C. for 10 days. Of the copolymer obtained 2% w. was added to a paraffinic, extracted lubricating oil of Venezuelan origin with a viscosity of 112 cs. at 100° F.

This addition effected a considerable improvement in the change in viscosity of the oil with temperature. This improvement is represented by the VT, i.e., $$\frac{\text{Specific viscosity at } 210°F.}{\text{Specific viscosity at } 100°F.} \times 100$$

The VT of the mixture tested was 127.

EXAMPLE VII

Vinyl esters prepared according to Example IV were copolymerized with dibutyl fumarate in the molar ratio 1:1, in the presence of 0.5% m. alpha-alpha'-azoisobutyronitrile, at 40° C. for 6 days. Of the copolymer obtained 2% w. was added to a paraffinic extracted lubricating oil of Venezuelan origin with a viscosity of 112 cs. at 100° F. The VT of the mixture thus obtained was 120.

EXAMPLE VIII

Vinyl esters prepared according to Example IV were copolymerized with maleic anhydride in the molar ratio 9:1, in the presence of 0.5% m. of ditertiary butyl peroxide at 100° C. for 2 days, then at 110° C. for 3 days and subsequently at 130° C. for 1 day. A solid and somewhat plastic polymer was obtained.

EXAMPLE IX

Vinyl chloride was copolymerized with vinyl esters prepared according to Example II or III, in the weight ratios 90:10, 85:15 and 75:25, in the presence of 0.25% m. of benzoyl peroxide. The temperature was kept for 5 days at 30° C., then for 4 days at 40° C. and subsequently for another 3 days at 50° C. The resulting copolymers had very good hardness while still possessing flexibility.

I claim as my invention:

1. A process for preparing substantially unhydrolyzable vinyl polymers which comprises copolymerizing in the presence of a free-radical catalyst vinyl esters of mixed alpha-branched saturated aliphatic monocarboxylic acids with another copolymerizable ethylenically unsaturated compound, said monocarboxylic acids being obtained by reacting mixtures of olefins containing at least 8 carbon atoms in the molecule with a member of the group consisting of (a) formic acid and (b) carbon monoxide and water, in the presence of inorganic acid catalysts, and said monocarboxylic acids being further characterized by consisting largely of molecules in which at least two hydrocarbon chains each of at least two carbon atoms are attached to the alpha carbon relative to the carboxyl group.

2. A process as in claim 1 wherein the ethylenically unsaturated compound contains up to 8 carbon atoms on either side of the double bond.

3. A process as in claim 1 wherein the vinyl esters of the mixed monocarboxylic acids are copolymerized with vinyl esters of other carboxylic acids.

4. A process as in claim 1 wherein the ethylenically unsaturated compound is vinyl acetate.

5. A process as in claim 1 wherein the molar ratio of the vinyl esters of the monocarboxylic acids to the ethylenically unsaturated compound is smaller than 1:1.

6. A process as in claim 1 wherein the mixed monocarboxylic acids are for the greater part acyclic.

7. A process as in claim 1 wherein the copolymerization is carried out in an aqueous medium.

8. A substantially unhydrolyzable vinyl polymer prepared by the process which comprises copolymerizing in the presence of a free-radical catalyst vinyl esters of mixed alpha-branched saturated aliphatic monocarboxylic acids with another copolymerizable ethylenically unsaturated compound, said monocarboxylic acids being obtained by reacting mixtures of olefins containing at least 8 carbon atoms in the molecule with a member of the group consisting of (a) formic acid and (b) carbon monoxide and water, in the presence of inorganic acid catalysts, and said monocarboxylic acids being further characterized by consisting largely of molecules in which at least two hydrocarbon chains each of at least two carbon atoms are attached to the alpha carbon relative to the carboxyl group.

9. A polymer as in claim 8 wherein the alpha-branched saturated aliphatic monocarboxylic acids have from 9 to 11 carbon atoms in the molecule.

10. A polymer as in claim 8 wherein the alpha-branched saturated aliphatic monocarboxylic acids have from 15 to 19 carbon atoms in the molecule.

References Cited by the Examiner
UNITED STATES PATENTS
2,310,780  2/43  Hanford et al. _____ 260—85.7

OTHER REFERENCES
Organic Synthesis, Migrdichian, Reinhold Publishing Co., N.Y., 1957, page 883 relied upon.

JOSEPH L. SCHOFER, *Primary Examiner.*
JAMES A. SEIDLECK, *Examiner.*